(12) United States Patent
Hyde et al.

(10) Patent No.: US 9,688,898 B2
(45) Date of Patent: Jun. 27, 2017

(54) ENERGY CONVERSION SYSTEMS AND METHODS

(71) Applicant: Elwha LLC, Bellevue, WA (US)

(72) Inventors: Roderick A. Hyde, Redmond, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 356 days.

(21) Appl. No.: 14/309,474

(22) Filed: Jun. 19, 2014

(65) Prior Publication Data

US 2015/0368536 A1 Dec. 24, 2015

(51) Int. Cl.
*C09K 5/16* (2006.01)
*C06B 43/00* (2006.01)
*F24J 1/00* (2006.01)

(52) U.S. Cl.
CPC ............... *C09K 5/16* (2013.01); *C06B 43/00* (2013.01); *F24J 1/00* (2013.01)

(58) Field of Classification Search
CPC combination set(s) only.
See application file for complete search history.

(56) References Cited

U.S. PATENT DOCUMENTS

| | | | |
|---|---|---|---|
| 441,242 A | 11/1890 | Haselhorst et al. | |
| 526,784 A | 10/1894 | Jones | |
| 3,353,349 A | 11/1967 | Percival | |
| 3,818,875 A | 6/1974 | Phillips et al. | |
| 4,020,798 A | 5/1977 | Skala | |
| 4,127,453 A | 11/1978 | Radebold | |
| 4,129,003 A | 12/1978 | Smith, Jr. | |
| 4,248,048 A | 2/1981 | Smith, Jr. | |
| 4,381,462 A | 4/1983 | Radebold | |
| 4,677,040 A | 6/1987 | Specht | |
| 5,712,442 A | 1/1998 | Lee et al. | |
| 5,789,696 A | 8/1998 | Lee et al. | |
| 6,093,504 A | 7/2000 | Bliesner | |
| 6,329,098 B1 | 12/2001 | Bliesner | |
| 6,649,823 B2 | 11/2003 | Zuppero et al. | |
| 7,119,272 B2 | 10/2006 | Zuppero et al. | |
| 2002/0121088 A1 | 9/2002 | Zuppero et al. | |
| 2003/0198843 A1 | 10/2003 | Struthers | |
| 2004/0016769 A1* | 1/2004 | Redmond | B82Y 30/00 222/3 |
| 2004/0053085 A1 | 3/2004 | Smedley et al. | |
| 2005/0189011 A1 | 9/2005 | Zuppero et al. | |
| 2005/0260468 A1 | 11/2005 | Fripp et al. | |
| 2015/0013499 A1* | 1/2015 | Asano | C22B 3/0005 75/739 |

* cited by examiner

*Primary Examiner* — David Walczak
(74) *Attorney, Agent, or Firm* — Foley & Lardner LLP

(57) ABSTRACT

A combustion system includes a reactant storage device configured to store lithium; a combustion device configured to receive the lithium from the reactant storage device and react the lithium with an oxidizer to generate heat energy; a product storage device configured to store reaction products resulting from the reaction of the lithium and the oxidizer; and a recovery device configured to recover lithium from the reaction products and provide the lithium to the storage device.

35 Claims, 4 Drawing Sheets

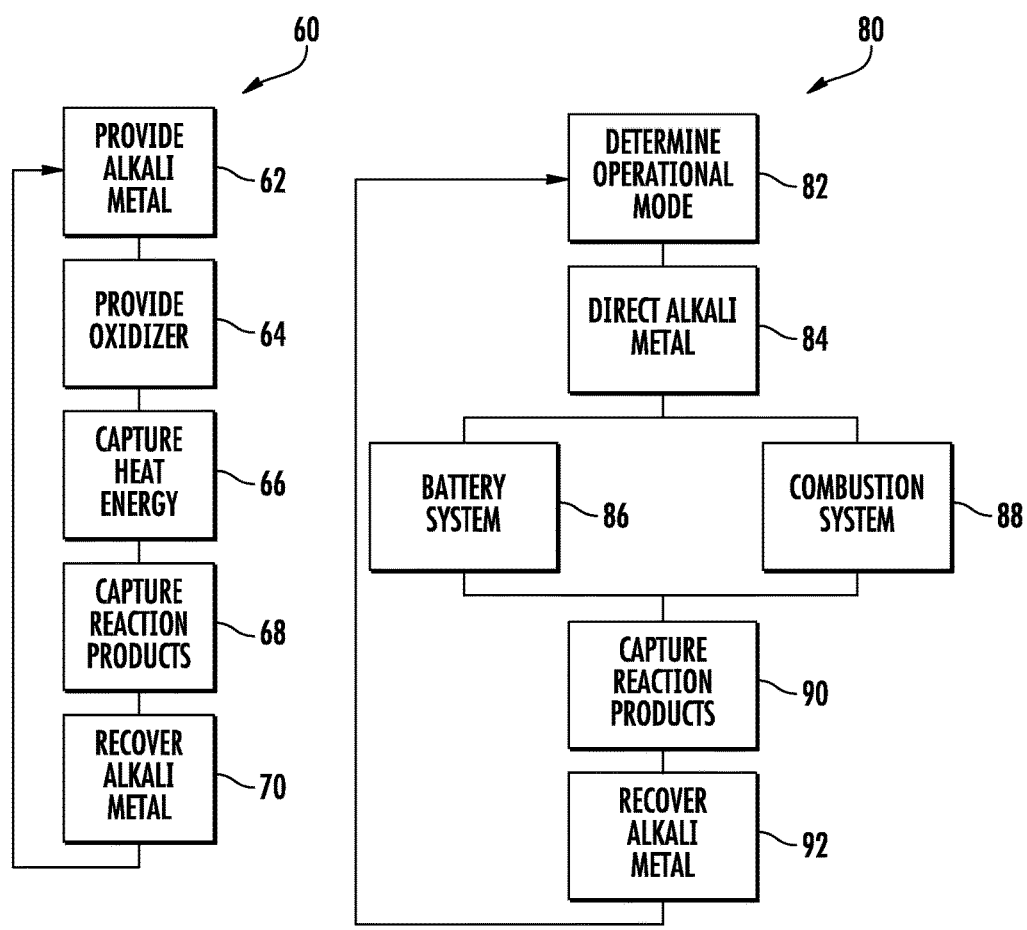

ENERGY CONVERSION SYSTEMS AND METHODS

BACKGROUND

Energy conversion systems are used to convert one form of energy to another form of energy. For example, an energy conversion system, such as an external combustion engine or external thermal engine, may convert heat energy into mechanical energy. To generate the heat energy, a combustion chamber may be used to combust various reactants (e.g., fuels and oxidizers) together in an exothermic reaction, such that the heat energy resulting from the reaction can be used to generate mechanical energy.

SUMMARY

One embodiment relates to a combustion system, including a reactant storage device configured to store lithium; a combustion device configured to receive the lithium from the reactant storage device and react the lithium with an oxidizer to generate heat energy; a product storage device configured to store reaction products resulting from the reaction of the lithium and the oxidizer; and a recovery device configured to recover lithium from the reaction products and provide the lithium to the storage device.

Another embodiment relates to a combustion system, including a reactant storage device configured to store an alkali metal; a combustion device configured to receive the alkali metal from the reactant storage device and react the metal with a dry molecular oxygen oxidizer to generate heat energy; a product storage device configured to receive reaction products resulting from the reaction of the alkali metal and the oxidizer; and a recovery device configured to recover the alkali metal from the reaction products and provide the alkali metal to the reactant storage device.

Another embodiment relates to an energy conversion system, including a supply system configured to store an alkali metal; a combustion system configured to combust the alkali metal in a thermal combustion engine; an electrochemical system configured to utilize the alkali metal in an electrochemical electrical generator; and a control system configured to control operation of the supply system to selectively provide the alkali metal to at least one of the combustion system and the electrochemical system.

Another embodiment relates to an energy recovery method, including storing lithium in a storage device; reacting the lithium with an oxidizer to generate heat energy; recovering lithium from reaction products resulting from the reaction of the lithium and the oxidizer; and providing the recovered lithium to the storage device.

Another embodiment relates to an energy recovery method, including storing an alkali metal in a storage device; reacting the alkali metal with a dry molecular oxygen oxidizer to generate heat energy; recovering the alkali metal from reaction products resulting from the reaction of the alkali metal and the oxidizer; and providing the recovered alkali metal to the storage device.

Another embodiment relates to a method of recovering energy, including storing an alkali metal in a storage device; selectively providing the alkali metal to at least one of a combustion engine configured to combust the alkali metal in a combustion chamber and an electrochemical system configured to utilize the alkali metal in an electrochemical generator; and recovering at least a portion of the alkali metal from reaction products of the combustion engine and the electrochemical system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION

FIG. 7 is a block diagram of a method of operating an energy conversion system according to one embodiment.

FIG. 8 is a block diagram of a method of operating an energy conversion system according to another embodiment.

DETAILED DESCRIPTION

Figure 1:
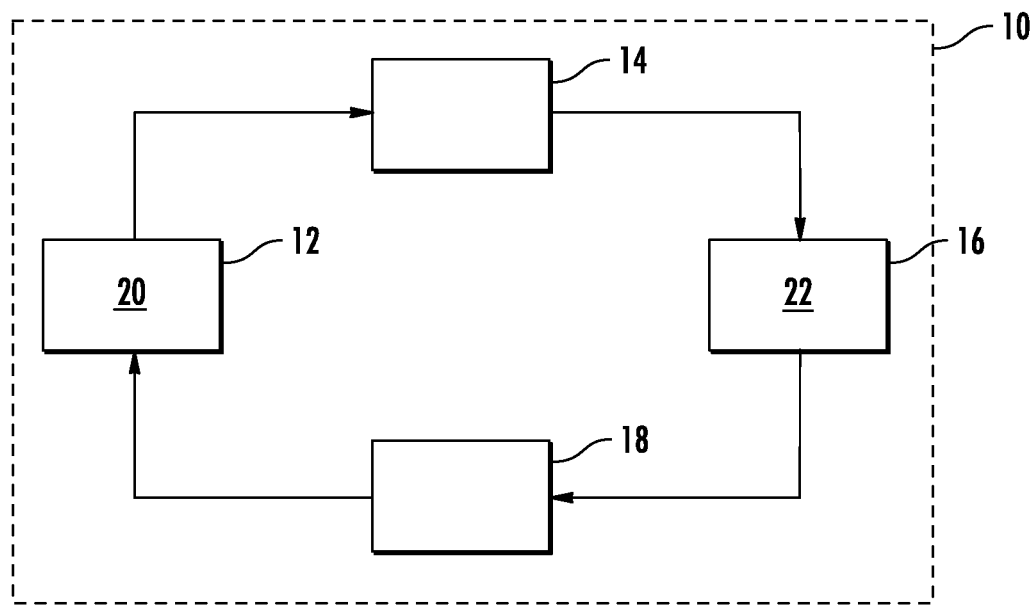
FIG. 1 is a block diagram of an energy conversion system according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, various embodiments disclosed herein relate to energy conversion systems where a fuel, such as an alkali metal, is reacted with an oxidizer, such as air, water, and the like, to generate heat energy. The heat energy can in turn be converted into mechanical energy, for example, by expanding a working fluid. The reaction products can be recovered, and all or a portion of the fuel (e.g., the alkali metal), can be recovered in later conversion processes. The recovery process can take place either in-line with the other processes, or alternatively, can be a remotely-performed process. Such conversion systems may enable, for example, converting stored chemical energy in a fuel to mechanical energy during high energy-usage periods (e.g., daytime), and enable recovery of fuel from the reaction products during low energy usage periods (e.g., nighttime). As such, the energy conversion system operates in many ways similar to a rechargeable battery.

Referring now to FIG. 1, energy conversion system 10 is shown according to one embodiment. As shown in FIG. 1, system 10 includes reactant storage device 12, combustion system 14, product storage device 16, and reactant recovery device 18. In general terms, reactant storage device 12 stores a fuel such as reactant 20 (e.g., an alkali metal, etc.), and provides reactant 20 to combustion system 14, where it is reacted with an oxidizer (e.g., air, oxygen, ozone, water, etc.) to generate heat. As a result of the chemical reaction between the fuel and oxidizer, oxides (e.g., metal oxides) and/or hydroxides (e.g., metal hydroxides) are formed as reaction products.

Some of the products of the reaction (e.g., metal-containing products) are directed to reactant recovery device 18, where all or a portion of the fuel is recovered for re-use in the energy conversion process. The fuel may be recovered on-board (e.g., proximate the other components of system 10) or at a remote recovery device (e.g., remote from the other components of system 10). The recovered fuel is directed back to reactant storage device 12.

In one embodiment, the reactants include a fuel and an oxidizer. A variety of fuels and oxidizers may be used according to various alternative embodiments. For example, in one embodiment, the fuel includes an alkali metal. The alkali metal may be lithium, sodium, potassium, cesium, rubidium, or francium. The alkali metal can be a combination (e.g., an alloy or eutectic) of two or more alkali elements (e.g., $Na_2K$). According to other embodiments, other metals are used. The oxidizer can be any suitable oxidizing agent, and can be or include air, oxygen ($O_2$), ozone ($O_3$), water ($H_2O$), and other oxidizing agents. In one embodiment, the oxidizer is a molecular oxygen oxidizer. In further embodiments, the oxidizer is a dry molecular oxygen oxidizer.

In one embodiment, lithium is used as a fuel and oxygen is used as an oxidizer. The resultant chemical reactions are expressed as $(4Li+O_2 \rightarrow 2Li_2O)$ and $(2Li+O_2 \rightarrow 2Li_2O_2)$. As shown in the reaction equations, lithium and oxygen produce lithium oxide and lithium peroxide as alkali-metal containing products of the reaction. Some or all of the products may be directed to a recovery device to recover lithium for re-use in subsequent processes.

In an alternative embodiment, lithium is used as a fuel and water is used as an oxidizer. The resultant chemical reaction is expressed as $(2Li+2H_2O \rightarrow 2LiOH+H_2)$. As shown in the reaction equation, lithium and water produce lithium hydroxide as an alkali-metal containing product of the reaction. As noted above, some or all of the product may be directed to a recovery device to recover lithium for re-use in subsequent processes. According to various alternative embodiments, other fuels and oxidizers may be used in addition to or instead of those illustrated above.

Figure 2:
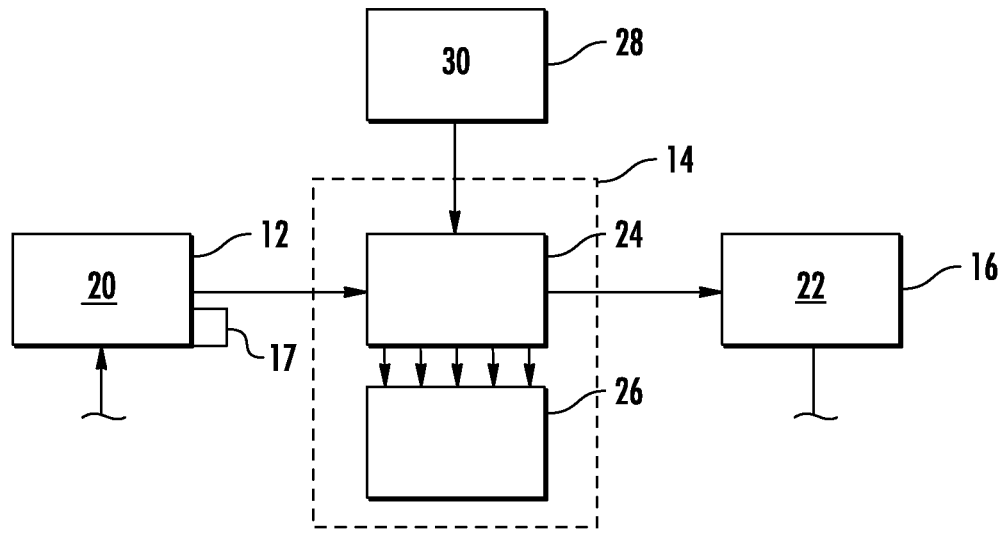
FIG. 2 is a block diagram of a portion of the energy conversion system of FIG. 1 according to one embodiment.

Referring now to FIG. 2, according to one embodiment, combustion system 14 includes combustion chamber 24 and thermal conversion device 26. Chamber 24 is any suitable chamber configured to receive the fuels and oxidizers discussed herein and enable a resulting reaction to occur. Thermal conversion device 26 is configured to convert the heat energy generated by the reaction within chamber 24 into another form of energy. As shown in FIG. 2, chamber 24 receives a fuel from reactant storage device 12 and provides reaction products to product storage device 16. In some embodiments, reactant storage device 12 is configured to store fuel as a solid, while in others it is configured to store the fuel as a liquid. The fuel can be stored at ambient temperatures or at an elevated temperature. In the latter case, reactant storage device 12 may incorporate thermal insulation, and may include a heat transfer device (e.g., a heat exchanger, a resistive heater, etc.) configured to help maintain the fuel (e.g., alkali metal) at the elevated temperature. The energy required for this transfer can be derived (e.g., as thermal energy or as electricity) from the heat energy generated by combustion of the fuel and oxidizer. In some embodiments, chamber 24 receives oxidizer 30 from oxidizer source 28. In other embodiments, in addition to or instead of receiving oxidizer 30 from oxidizer source 28, combustion system 14 extracts oxidants (e.g., air, water, molecular oxygen, etc.) from the surrounding ambient environment.

According to various embodiments, thermal conversion device 26 is an external combustion engine or an external thermal engine configured to convert heat energy into mechanical energy by, for example, heating a working fluid. For example, in one embodiment, thermal conversion device 26 is a Stirling engine, and heat energy generated by chamber 24 is used to, for example, heat the hot-plate of the Stirling engine. According to various alternative embodiments, thermal conversion device 26 can take other forms, such as vehicular internal combustion engines. In one embodiment, thermal conversion device 26 converts heat energy into electricity. For example, thermal conversion device 26 may be a thermopile including a number of thermocouples and being configured to convert heat energy into electrical energy. For example, thermal conversion device 26 may be an electrical generator configured to convert heat energy into electrical energy via mechanical energy. It should be noted that according to various further embodiments, thermal conversion device 26 can take other forms.

Figure 3:
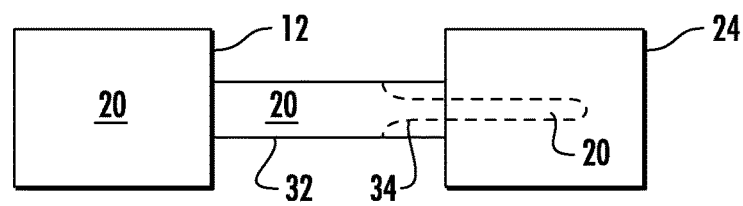
FIG. 3 is a block diagram of a portion of the energy conversion system of FIG. 1 according to another embodiment.

Referring to FIG. 3, in one embodiment, system 10 includes transfer device 32. Transfer device 32 is configured to direct fuel from reactant storage device 12 to combustion chamber 24. Transfer device 32 may include any suitable transfer device or mechanism, including conduits, tubes, conveyor systems, and the like. In one embodiment, transfer device 32 is configured to accommodate liquid fuels, while in other embodiments transfer device 32 is configured to accommodate solid and/or liquid fuels.

Referring further to FIG. 3, in one embodiment, system 10 further includes deformation mechanism 34. Deformation mechanism 34 is configured to deform a fuel in solid form prior to the fuel being introduced into combustion chamber 24. Deformation of the fuel acts to increase the surface area of the solid fuel. Fuel 20 shown in FIG. 3 can be provided in a variety of forms, including as a wire or rod, pellets, solid pieces, etc. The solid fuel is directed from reactant storage device 12, through transfer device 32, and to deformation mechanism 34. Deformation mechanism 34 may include opposing plates, rollers, or similar structures (e.g., rotating, reciprocating, or other deformation members) intended to flatten or deform fuel 20 and thereby increase the exposed surface area of the fuel. Upon fuel 20 being introduced into combustion chamber, the fuel reacts with an appropriate oxidizer to generate heat energy to be used by thermal conversion device 26.

It should be understood that transfer device 32 and deformation mechanism 34 may take a variety of forms according to various alternative embodiments, and be positioned at any suitable location between reactant storage device 12 and combustion chamber 24. In some embodiments, deformation mechanism 34 is omitted (e.g., in the case of using fuel in liquid form). In some embodiments, transfer device 32 may be or include a heat transfer device (e.g., a heat exchanger, a resistive heater, etc.) configured to heat and melt the solid fuel so as to store it in reactant storage device 12 as a solid, yet provide it to combustion chamber 24 as a liquid. The energy required for the melting can be derived (e.g., as thermal energy or as electricity) from the heat energy generated by combustion of the fuel and oxidizer. All such combinations of features are within the scope of the present disclosure.

Figure 4:
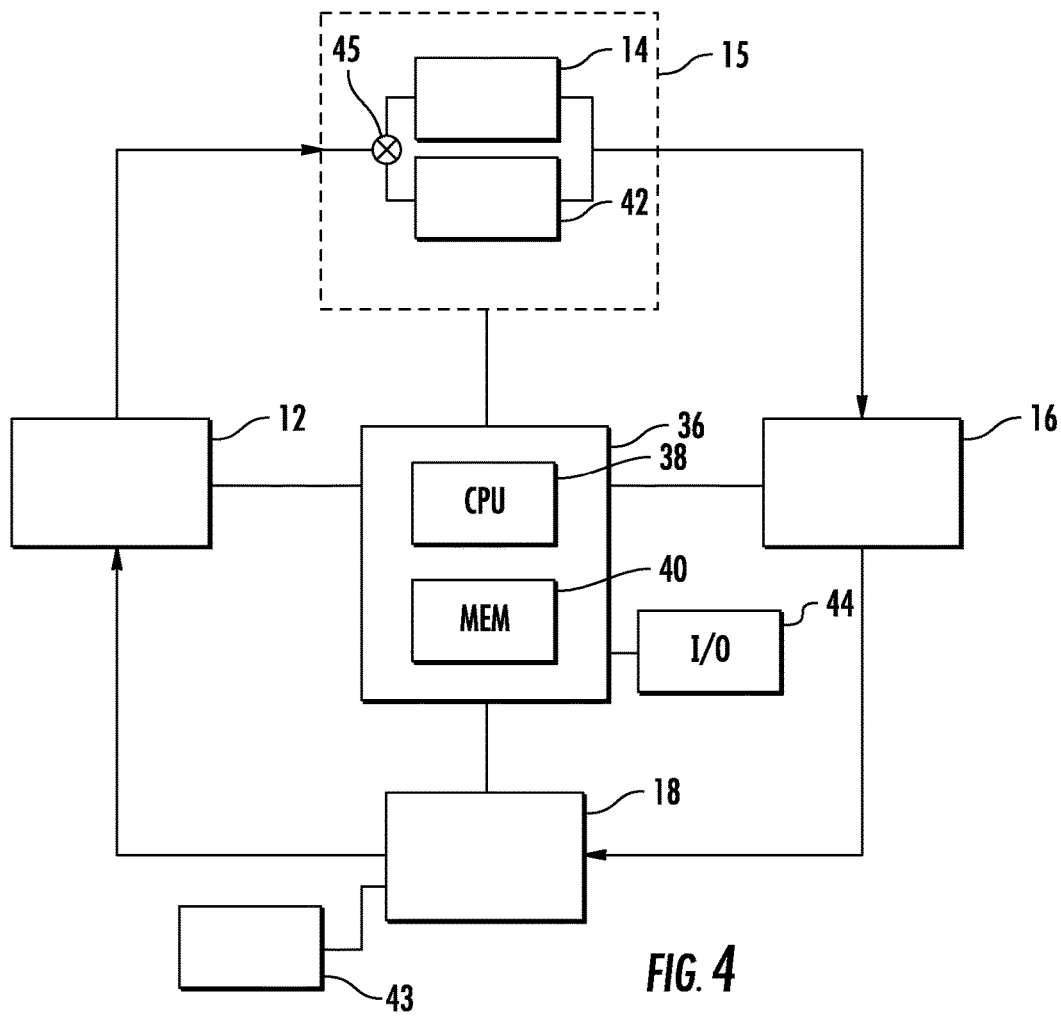
FIG. 4 is a schematic illustration of a control system of the energy conversion system of FIG. 1 according to one embodiment.

Referring now to FIG. 4, in one embodiment, system 10 includes energy conversion device 15, and the fuel can be selectively provided to one or more components of energy conversion device 15. For example, as shown in FIG. 4, energy conversion device 15 includes both combustion system 14 and electrochemical system 42. Electrochemical system 42 can include an electrochemical electrical generator, such as a battery and/or a fuel cell. The battery may be any suitable battery configured to use a fuel such as an alkali metal, for instance a battery using either lithium or sodium as an anode material and using the oxidizer as a cathode material. Such batteries may use air or oxygen as oxidizers (e.g., a lithium-air battery). Such batteries may use a variety of other oxidizers in their cathodes, such as a lithium battery employing manganese dioxide, carbon monofluoride, iron disulfide, thionyl chloride, sulfur dioxide, iodine, copper sulfide, iron sulfide, vanadium pentoxide, lead bismuthate, copper oxide, copper chloride, silver chromate, or the like as cathode materials. In one embodiment, the battery may be a molten-salt battery, for instance using lithium or sodium as an anode material and using sulfur or a sulfur compound as an oxidizer for the cathode. The fuel cell may be any suitable fuel cell configured to use a fuel such as an alkali metal, such as those disclosed in U.S. Pat. No. 7,491,458 ("Active Metal Fuel Cells") or U.S. Pat. No. 8,709,679 ("Active Metal Fuel Cells"), both of which are incorporated herein by reference in their entireties. Fuel is selectively directed to one or both of combustion system 14 and electrochemical system 42 from reactant storage device 12. From combustion system 14 and electrochemical system 42, reaction products are directed to product storage device 16. From product storage device 16, the products are transferred to recovery device 18.

Referring further to FIG. 4, in one embodiment the various components of energy conversion system 10 are controlled by control unit 36. As shown in FIG. 4, control unit includes processor 38 and memory 40. Processor 38 may be implemented as a general-purpose processor, an application specific integrated circuit (ASIC), one or more field programmable gate arrays (FPGAs), a digital-signal-processor (DSP), a group of processing components, or other suitable electronic processing components. Memory 40 is one or more devices (e.g., RAM, ROM, Flash Memory, hard disk storage, etc.) for storing data and/or computer code for facilitating the various processes described herein. Memory 40 may be or include non-transient volatile memory or non-volatile memory. Memory 40 may include database components, object code components, script components, or any other type of information structure for supporting the various activities and information structures described herein. Memory 40 may be communicably connected to processor 38 and provide computer code or instructions to processor 38 for executing the processes described herein.

According to various embodiments, control unit 36 is configured to control operation of the various other components of system 10, including reactant storage device 12, energy conversion device 15 (including combustion system 14 and electrochemical system 42), product storage device 16, and recovery device 18. Control unit 36 operates the various components based on one or more factors, including a desired type of energy output (e.g., mechanical energy, electrical energy, etc.), operating efficiency of the energy conversion device components, user preferences, and the like. In one embodiment, user inputs are received from and outputs provided to users by way of input/output device 44. As such, a user is able to specify, for example, whether fuel should be directed to combustion system 14, electrochemical system 42, or both. In some embodiments electrochemical system 42 comprises both a battery and a fuel cell; in such embodiments control unit 36 can selectively activate either or both the battery and fuel cell.

In one embodiment, a valve such as valve 45 is provided between reactant storage device 12 and energy conversion device 15. Valve 45 acts to control the amount of fuel directed from reactant storage device 12 to one or both of combustion system 14 and electrochemical system 42. Control of an oxidizer supply can be provided in a similar manner. Control unit 36 is configured to operate valve 45 (e.g., to move valve 45 toward an open or closed position) based on the fuel requirements of energy conversion device 15, and more specifically the fuel requirements of combustion system 14 and electrochemical system 42. The fuel requirements (e.g., the total amount, the rate, etc.) and/or oxidizer requirements can be based upon energy or power demands from a load served by energy conversion system 10 or energy conversion device 15. Any suitable valving mechanism can be used according to various alternative embodiments. In some embodiments, energy conversion system 10 includes a gauge 17 (digital or analog) or other monitoring and reporting device designed to indicate to a user the amount of stored fuel, oxidizer, or reaction products. Gauge 17 may be coupled to any of the storage delivery components of system 10 to measure a corresponding amount of material (e.g., fuel, oxidizer, reaction product, etc.).

It should be noted that while FIG. 4 shows two systems (combustion system 14 and electrochemical system 42), according to various other embodiments, more or fewer fuel-consuming devices or systems may be used than those shown in FIG. 4, and other types of fuel-consuming systems may be used in addition to the combustion system and the electrochemical system shown in FIG. 4. As such, control unit 36 can be configured to operate any number of fuel-consuming systems or devices based on any of the factors discussed herein.

Referring further to FIG. 4, recovery of the fuel from reaction products may occur either on-board with the other components of system 10 (e.g., on a vehicle, proximate the remaining system components, etc.) or at a remote location (e.g., at a recharging or recovery station, etc.). As such, in some embodiments system 10 includes power source 43. Power source 43 is intended to provide the required power to recover fuel (e.g., an alkali metal) from one or more reaction products via chemical processing (e.g., electrolysis). Power source 43 may be an on-board power source, or alternatively, may be coupled to an external power source (e.g., a plug, wall outlet, etc.).

In some embodiments, control unit 36 is configured to operate energy conversion device 15 and recovery device 18 (and, therefore, power source 43) at predetermined times to make the use of system 10 most cost-effective. For example, during periods of peak power/electricity demand, system 10 may be operated to generate power via consumption of fuel 20 (e.g., via combustion system 14 and/or electrochemical system 42). During periods of lower power/electricity demand, system 10 may be operated to recover all or some of the fuel from reaction products generated during the peak hours. Control unit 36 can be configured to operate system 10 according to different factors in various alternative embodiments.

Figure 5:
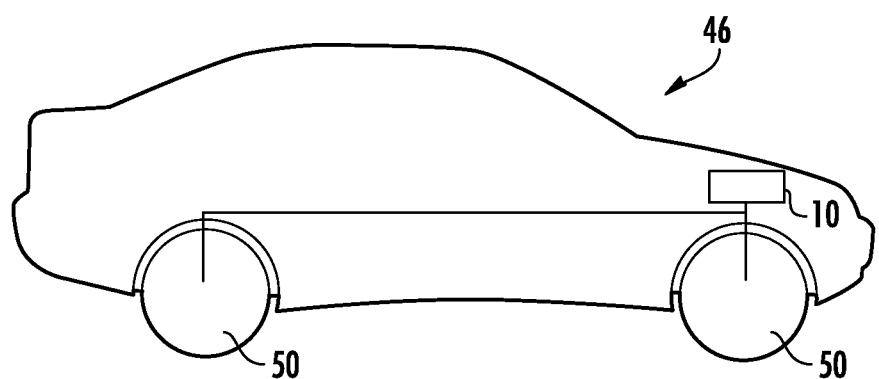
FIG. 5 is a front view of a vehicle usable with the energy conversion system of FIG. 1 according to one embodiment.
Figure 6:
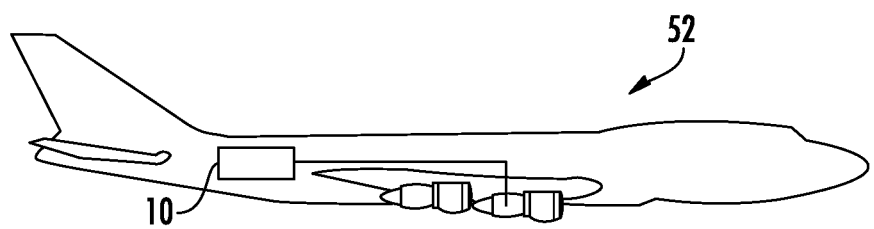
FIG. 6 is a front view of a vehicle usable with the energy conversion system of FIG. 1 according to another embodiment.

Referring now to FIGS. 5-6, vehicles utilizing energy conversion systems such as system 10 are shown according to alternative embodiments. As shown in FIG. 5, in one embodiment system 10 is implemented in vehicle 46. Vehicle 46 may be an automobile, motorcycle, train, or any other suitable vehicle. System 10 is operable to provide power to one or more wheels 50. Alternatively, wheels 50 may be replaced by tracks or other motive members. Vehicle 46 may be operated by using a fuel such as an alkali metal in a combustion and/or electrochemical system configured to operate one or more vehicle systems. Reaction products may be recovered either on-board the vehicle or at a separate location. As such, in some embodiments, reactant storage device 12 and/or product storage device 16 are provided as removable/replaceable components such that reactants can be provided to and products removed from vehicle 46.

As shown in FIG. 6, in one embodiment, system 10 is implemented in vehicle 52. Vehicle 52 may be an aircraft (e.g., an airplane, helicopter, etc.) or another suitable vehicle (e.g., a watercraft, etc.). System 10 is operable to provide power to one or more propulsion devices 56 (e.g., aircraft engines, etc.). Vehicle 52 may be operated by using a fuel such as an alkali metal in a combustion and/or electrochemical system configured to operate one or more vehicle systems. Reaction products may be recovered either on-board the vehicle or at a separate location. As such, in some embodiments, reactant storage device 12 and/or product storage device 16 are provided as removable/replaceable components such that reactants can be provided to and products removed from vehicle 52.

In various alternative embodiments, system 10 may be implemented in a wide variety of other applications, including other types of vehicles, electronic devices such as portable electronics (e.g., laptop computers, cellular phones, and the like), stationary equipment or machinery, etc. In all such embodiments, recovery of fuel may occur on-board the device or by way of a separate or remote recovery system.

Referring now to FIG. 7, method 60 of operating an energy conversion system is shown according to one embodiment. A fuel is provided to a combustion system (60). In one embodiment, the fuel is an alkali metal. The fuel may be provided in liquid or solid form. The fuel may be stored in a reactant storage device such as reactant storage device 12. An oxidizer is provided to the combustion system (64). In one embodiment, the oxidizer is a molecular oxygen oxidizer. In further embodiments, the oxidizer is a dry molecular oxygen oxidizer. The oxidizer may be stored in an oxidant storage device such as oxidant storage device 28. Alternatively, the oxidizer may be extracted from the ambient environment. The fuel and oxidizer react within a combustion chamber and the resultant heat energy is captured (66). In one embodiment, the heat energy is used in combination with a thermal conversion device such as an external combustion system, a generator, or a thermopile. Reaction products from the reaction of the fuel and oxidizer are captured (68). In one embodiment, capturing the reaction products includes capturing metal-containing reaction products (e.g., those products containing one or more alkali metals). All or a portion of the fuel is recovered from the reaction products (70). Recovering the fuel may include electrochemically processing the reaction products (e.g., via electrolysis) to recover the fuel. Recovery of the fuel may be performed in an on-board or remote fashion. The recovered fuel can then be used in subsequent processes.

Referring now to FIG. 8, method 80 of operating an energy conversion system is shown according to one embodiment. An operational mode is determined (82). Determining an operational mode includes determining the amount of fuel to provide to one or both of a first fuel consumption system (e.g., a combustion system) and a second fuel consumption system (e.g., an electrochemical system). The determination can be made based on a variety of factors, including desired output energy type (e.g., mechanical, electrical, etc.), operating efficiency, user preferences, etc. Based on the operational mode, fuel is directed to one or both of first and second fuel consumption devices (84) (e.g., energy conversion devices). The fuel may be directed to a electrochemical system (86) and/or a combustion system (88) to convert the chemical energy of the fuel into electrical and/or mechanical energy. Reaction products are captured (90). In one embodiment, capturing the reaction products includes capturing metal-containing reaction products (e.g., those products containing one or more alkali metals). All or a portion of the fuel is recovered from the reaction products (92). Recovering the fuel may include electrochemically processing the reaction products (e.g., via electrolysis) to recover the fuel. Recovery of the fuel may be performed in an on-board or remote fashion. The recovered fuel can then be used in subsequent processes.

It should be noted that the embodiments disclosed herein may provide various benefits over more convention energy conversion systems. For example, lithium, an alkali metal, provides 140 kCal/mole for oxidizing the lithium to $Li_2O$ (or 10 kCal/g of metal, or 42 kJ/g of metal). This compares well to the 46-47 kJ/g provided by fully oxidizing kerosene or gasoline, especially considering that when the formed water vapor is not condensed (which is typical), the effective energy yield of kerosene or gasoline may be approximately 8 percent lower. Furthermore, $Li_2O$ is a relative compact solid at relevant temperatures, having a density of 2.01 $g/c^3$. If desired the $Li_2O$ can be converted to liquid form (e.g., by addition of water) for ease of transportation and movement. Furthermore, other alkali metals (e.g., $Na_2K$) may provide for room temperature fuels with greater density at a lower cost than lithium. As such, any of a number of the alkali metals may be used in any of the embodiments disclosed herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A combustion system, comprising:
   a reactant storage device configured to store lithium;
   a combustion device configured to receive the lithium from the reactant storage device and react the lithium with an oxidizer to generate heat energy;
   a product storage device configured to store reaction products resulting from the reaction of the lithium and the oxidizer; and
   a recovery device configured to recover lithium from the reaction products and provide the lithium to the storage device.

2. The combustion system of claim 1, wherein the combustion device is adapted to react the lithium with an oxidizer including molecular oxygen.

3. The combustion system of claim 1, wherein the combustion device is adapted to react the lithium with an oxidizer including molecular oxygen and a dry molecular oxygen oxidizer.

4. The combustion system of claim 1, further comprising a combustion engine, wherein the combustion engine includes the combustion device.

5. The combustion system of claim 4, wherein the combustion engine comprises a reactant metering system configured to control the delivery rate of at least one of the lithium and the oxidizer into the combustion device responsive to a specified generation rate of heat energy.

6. The combustion system of claim 4, wherein the combustion engine includes an external combustion engine.

7. The combustion system of claim 1, further comprising a thermopile configured to convert heat energy into electrical energy.

8. The combustion system of claim 7, wherein the combustion device is configured to provide heat energy to the thermopile.

9. The combustion system of claim 1, wherein the reactant storage device is configured to store the lithium in solid form.

10. The combustion system of claim 9, further comprising a transfer device configured to transfer the lithium from the reactant storage device to the combustion device, the transfer device including a deformation mechanism configured to deform the lithium in solid form to increase a surface area of the lithium prior to the lithium entering into the combustion device.

11. The combustion system of claim 9, further comprising a transfer device configured to transfer the lithium from the reactant storage device to the combustion device, the transfer device including a thermal heating system configured to melt at least a portion of the lithium prior to the portion of lithium entering into the combustion device.

12. The combustion system of claim 1, wherein the reactant storage device is configured to store lithium in liquid form.

13. The combustion system of claim 12, further comprising a heat exchanger configured to transfer at least a portion of the generated heat energy into the stored liquid lithium.

14. A combustion system, comprising:
    a reactant storage device configured to store an alkali metal;
    a combustion device configured to receive the alkali metal from the reactant storage device and react the metal with a dry molecular oxygen oxidizer to generate heat energy;
    a product storage device configured to receive reaction products resulting from the reaction of the alkali metal and the oxidizer; and
    a recovery device configured to recover at least a portion of the alkali metal from the reaction products and provide the alkali metal to the reactant storage device.

15. The combustion system of claim 14, further comprising a combustion engine, wherein the combustion engine includes the combustion device.

16. The combustion system of claim 15, wherein the combustion engine is configured to convert heat energy into mechanical energy.

17. The combustion system of claim 15, wherein the combustion engine comprises a reactant metering system configured to control a delivery rate of at least one of the alkali metal and the dry molecular oxygen oxidizer into the combustion device responsive to a specified generation rate of heat energy.

18. The combustion system of claim 15, wherein the combustion engine includes an external combustion engine.

19. The combustion system of claim 14, further comprising a thermopile configured to convert heat energy into electrical energy.

20. The combustion system of claim 19, wherein the combustion device is configured to provide heat energy to the thermopile.

21. The combustion system of claim 14, wherein the reactant storage device is configured to store the alkali metal in solid form.

22. The combustion system of claim 21, further comprising a transfer device configured to transfer the alkali metal from the reactant storage device to the combustion device, the transfer device including a deformation mechanism configured to deform the alkali metal in solid form to increase a surface area of the alkali metal prior to the metal entering into the combustion device.

23. The combustion system of claim 21, further comprising a transfer device configured to transfer the alkali metal from the reactant storage device to the combustion device, the transfer device including a thermal heating system configured to melt at least a portion of the alkali metal prior to the portion of alkali metal entering into the combustion device.

24. The combustion system of claim 23, further comprising a heat exchanger configured to transfer at least a portion of the generated heat energy into the portion of the alkali metal.

25. An energy conversion system, comprising:
    a supply system configured to store an alkali metal;

a combustion system configured to combust the alkali metal in a thermal combustion engine;

an electrochemical system including an electrochemical electrical generator configured to utilize the alkali metal; and a control system configured to control operation of the supply system to selectively provide the alkali metal to at least one of the combustion system and the electrochemical system.

26. The system of claim 25, wherein the electrochemical electrical generator comprises a battery.

27. The system of claim 25, wherein the electrochemical electrical generator comprises a fuel cell.

28. The system of claim 25, wherein the control system is configured to control operation of the supply system based on a desired power output amount of the energy conversion system.

29. The system of claim 25, wherein the control system is configured to control operation of the supply system based on a user input.

30. The system of claim 25, wherein the control system is configured to control operation of the supply system based on a desired power output type.

31. The system of claim 25, further comprising a recovery device configured to receive reaction products from at least one of the combustion system and the electrochemical system and recover alkali metal from the reaction products.

32. The system of claim 31, wherein the supply system is configured to receive at least a portion of the recovered alkali metal.

33. The system of claim 25, wherein the combustion system includes an external combustion engine.

34. The system of claim 25, further comprising a transfer device configured to transfer the alkali metal from the supply system to the combustion system and the electrochemical system, the transfer device including a deformation mechanism configured to deform the alkali metal in solid form to increase a surface area of the alkali metal.

35. The system of claim 25, wherein the supply system is configured to store the alkali metal in liquid form.

\* \* \* \* \*